United States Patent [19]
Wright et al.

[11] Patent Number: 6,111,027
[45] Date of Patent: Aug. 29, 2000

[54] ADHESIVES COMPRISING COPOLYMERS OF MACROMONOMERS AND UNSATURATED ACIDS OR ANHYDRIDES

[75] Inventors: Pamela J. Wright, Easton, Pa.; Dennis George Peiffer, Annandale, N.J.; Kenneth Lewtas, Tervuren, Belgium; Quoc Luvinh, Brussels, Belgium; Joseph Jacques Ripet, Brussels, Belgium; Anne Vera Macedo, Brussels, Belgium

[73] Assignee: Exxon Chemical Patents, Inc, Baytown, Tex.

[21] Appl. No.: 09/164,801

[22] Filed: Oct. 1, 1998

Related U.S. Application Data

[63] Continuation-in-part of application No. 08/942,146, Oct. 1, 1997.

[51] Int. Cl.$^7$ ................................................. C08F 210/00
[52] U.S. Cl. ........................ 525/301; 525/322; 525/327; 525/380
[58] Field of Search .................. 525/301, 322, 525/337, 380

[56] References Cited

U.S. PATENT DOCUMENTS

| | | | |
|---|---|---|---|
| 2,551,813 | 5/1951 | Pinkney | 260/609 |
| 4,078,132 | 3/1978 | Lepert | 526/76 |
| 4,668,834 | 5/1987 | Rim et al. | 585/12 |
| 4,704,491 | 11/1987 | Tsutsui et al. | 585/10 |
| 4,839,074 | 6/1989 | Rossi et al. | 252/56 D |
| 4,994,516 | 2/1991 | Luvinh | 524/275 |
| 5,017,714 | 5/1991 | Welborn, Jr. | 556/12 |
| 5,055,438 | 10/1991 | Canich | 502/117 |
| 5,096,867 | 3/1992 | Canich | 502/103 |
| 5,112,507 | 5/1992 | Harrison | 252/51.5 A |
| 5,153,157 | 10/1992 | Hlatky et al. | 502/117 |
| 5,171,793 | 12/1992 | Johnson et al. | 525/332.1 |
| 5,198,401 | 3/1993 | Turner et al. | 502/155 |
| 5,229,022 | 7/1993 | Song et al. | 252/56 R |
| 5,240,894 | 8/1993 | Burkhardt et al. | 502/108 |
| 5,264,405 | 11/1993 | Canich | 502/103 |
| 5,310,806 | 5/1994 | Wild et al. | |
| 5,324,800 | 6/1994 | Welborn, Jr. et al. | 526/160 |
| 5,346,963 | 9/1994 | Hughes et al. | 525/285 |
| 5,441,545 | 8/1995 | Lewtas et al. | 44/393 |
| 5,507,475 | 4/1996 | Seel et al. | 267/64.12 |
| 5,571,867 | 11/1996 | Luvinh et al. | 525/99 |
| 5,616,153 | 4/1997 | Mike et al. | 525/322 |
| 5,625,005 | 4/1997 | Mallya et al. | |

FOREIGN PATENT DOCUMENTS

| | | |
|---|---|---|
| 1268753 | 5/1990 | Canada . |
| 0 046 344 | 2/1982 | European Pat. Off. . |
| 0 082 726 | 6/1983 | European Pat. Off. . |
| 0 129 368 | 12/1984 | European Pat. Off. . |
| 0 214 786 | 3/1987 | European Pat. Off. . |
| 0 277 003 | 8/1988 | European Pat. Off. . |
| 0 277 004 | 8/1988 | European Pat. Off. . |
| 0 296 714 | 12/1988 | European Pat. Off. . |
| 0 426 637 | 5/1991 | European Pat. Off. . |
| 0 495 375 | 7/1992 | European Pat. Off. . |
| 0 500 944 | 9/1992 | European Pat. Off. . |
| 0 520 732 | 12/1992 | European Pat. Off. . |
| 0 570 982 | 11/1993 | European Pat. Off. . |
| 0 573 403 | 12/1993 | European Pat. Off. . |
| 0 620 258 A2 | 10/1994 | European Pat. Off. . |
| 195 28 369 | 2/1996 | Germany . |
| WO 91/07472 | 5/1991 | WIPO . |
| WO 91/09882 | 7/1991 | WIPO . |
| WO 92/00333 | 1/1992 | WIPO . |
| WO 93/24539 | 12/1993 | WIPO . |
| WO 94/03506 | 2/1994 | WIPO . |
| WO 94/13715 | 6/1994 | WIPO . |
| WO 94/26816 | 11/1994 | WIPO . |
| WO 96/23010 | 8/1996 | WIPO . |

OTHER PUBLICATIONS

"Initiators", C.S. Sheppard and V. Kamath, pp. 355–373 in *Kirk–Othmer Encyclopedia of Chemical Technology*, 3rd edition, vol. 13, Wiley Interscience, New York, 1981, month unavailable.

*Primary Examiner*—Jacqueline V. Howard
*Attorney, Agent, or Firm*—John E. Schneider; David J. Alexander

[57] ABSTRACT

This invention relates to an adhesive composition comprising a copolymer comprising units derived from one or more macromonomers and an unsaturated acid or an unsaturated anhydride wherein the weight average molecular weight of the copolymer is at least twice the weight average molecular weight of the macromonomer, the melt index of the copolymer is 1 dg/min or more, and wherein the macromonomer:

(1) has a weight average molecular weight between 500 and 100,000;
(2) has at least 30% terminal unsaturation; and
(3) comprises a copolymer of ethylene and at least one α-olefin, and/or a copolymer of propylene and ethylene or an α-olefin.

43 Claims, No Drawings

6,111,027

ADHESIVES COMPRISING COPOLYMERS OF MACROMONOMERS AND UNSATURATED ACIDS OR ANHYDRIDES

CROSS REFERENCE TO RELATED APPLICATIONS

This application is a-continuation-in-part of co-pending patent application U.S. Ser. No. 08/942,146, filed on Oct. 1, 1997.

FIELD OF THE INVENTION

This invention relates to adhesives comprising copolymers of ethylene and one or more $\alpha$-olefins (called macromonomers) and unsaturated acids or anhydrides.

BACKGROUND

U.S. Pat. No. 5,346,963 discloses Substantially Linear Ethylene Polymers grafted with an organic acid, such as maleic acid or maleic anhydride. However these polymers are the result of a grafting reaction rather than the product of a copolymerization reaction between a terminally unsaturated macromonomer and an unsaturated acid or anhydride.

Copolymers of maleic anhydride and other olefins are known in the literature. For example copolymers of maleic anhydride and alpha-olefins have been disclosed in U.S. Pat. No. 5,441,545. These copolymers are of rather low molecular weights, i.e. approximately C12–C18 with molecular weights of 250 or less. Copolymers of maleic anhydride and styrene are known, for example see U.S. Pat. No. 4,839,074 and European Patent Applications 0 214 786 and 0 296 714. Likewise copolymers of isobutylene and maleic anhydride are apparently disclosed in U.S. Pat. No. 5,112,507. But this polymer is expected to have the disadvantage of little to no crystallinity, which would mean poor strength characteristics in a final adhesive.

BRIEF DESCRIPTION OF THE INVENTION

This invention relates to a copolymer, which has many potential commercial uses where adhesion is a key property, for example, assembly adhesives, road marking compositions, etc. This invention further relates to an adhesive comprising an optional tackifying resin and a copolymer comprising units derived from one or more macromonomers and an unsaturated acid or anhydride wherein the copolymer's weight average molecular weight is at least two times the weight average molecular weight of the macromonomer and the copolymer's melt index is greater than or equal to 1 dg/min. If more than one macromonomer is used and they have different molecular weights then the copolymer's Mw is compared to the weighted average of the weight average molecular weights of the macromonomers. For the purposes of this invention an adhesive is any composition that adheres to itself or another substrate.

Preferably, this invention relates to an adhesive composition comprising an optional resin and a copolymer comprising units derived from one or more macromonomers and an unsaturated acid or an unsaturated anhydride wherein the weight average molecular weight (Mw) of the copolymer is at least three times the Mw of the macromonomer and wherein the macromonomer:

(1) has an Mw between 500 and 100,000;
(2) has at least 30% terminal unsaturation; and
(3) comprises a copolymer of ethylene and at least one $\alpha$-olefin, and/or a copolymer of propylene and ethylene or an $\alpha$-olefin.

Terminal unsaturation is defined to include both vinyl and vinylidene unsaturation.

In a preferred embodiment the Mw of the copolymer of the macromonomer and the unsaturated acid or unsaturated anhydride is at least four times larger than the Mw of the macromonomer, preferably at least five times larger than the Mw of the macromonomer, even more preferably at least six times larger than the Mw of the macromonomer. In a preferred embodiment the melt index of the copolymer of the macromonomer and the unsaturated acid or anhydride is greater than or equal to 1 dg/min, preferably greater than or equal to 2 dg/min. Melt index is measured according to ASTM D-1238. If the melt index cannot be measured because the molecular weight of the sample is too low, then the melt index is deemed to be greater than 2 dg/min for purposes of this invention.

DETAILED DESCRIPTION OF THE INVENTION

In a preferred embodiment the macromonomers comprise copolymers of ethylene and up to 75 weight % of one or more $C_3$ to $C_{30}$ $\alpha$-olefins, based upon the weight of the copolymer. The $C_3$ to $C_{30}$ $\alpha$-olefin may be a linear or branched $\alpha$-olefin, and is preferably selected from the group consisting of propylene, butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

In another preferred embodiment the macromonomer comprises a copolymer of propylene and up to 75 weight % ethylene and/or a $C_4$ to $C_{30}$ $\alpha$-olefin, based upon the weight of the copolymer. The $C_4$ to $C_{30}$ $\alpha$-olefin may be a linear or branched $\alpha$-olefin, and is preferably selected from the group consisting of butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

In another preferred embodiment the macromonomer comprises a terpolymer of ethylene, propylene and one or more $C_4$ to $C_{30}$ $\alpha$-olefins. Preferred $C_4$ to $C_{30}$ $\alpha$-olefins include linear or branched $\alpha$-olefins, preferably $\alpha$-olefins selected from the group consisting of butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

The macromonomers can be produced by polymerizing the desired monomers in the presence of an activated cyclopentadienyl transition metal catalyst. Such catalysts typically comprise cyclopentadienyl transition metal compounds combined with an activator such as an alumoxane or a non-coordinating anion. The transition metal may be bound to one, two or three cyclopentadienyl groups and the groups may be substituted or unsubstituted and bridged or unbridged. The activated catalyst may be used in gas phase, slurry phase, solution phase, in bulk or high pressure. For more information regarding such catalyst compounds and processes to use them to produce polyolefins please refer to WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO 91/09882; WO 94/03506, WO 96/23010 and U.S. Pat. No. 5,055,438. U.S. Pat. Nos. 4,668,834, 4,704,491, 5,229,022 and WO 94/13715 are particularly useful to refer to. A preferred class of catalysts for use in preparing macromonomers useful in this invention are the mono and biscyclopentadienyl group 4 catalysts. In a preferred embodiment the biscyclopentadienyl group 4 catalysts are those represented by the formula:

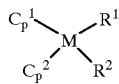

Where $Cp^1$ and $Cp^2$ are independently a substituted or unsubstituted cyclopentadienyl, fluorenyl or indenyl and may be bridged or unbridged and $R^1$ and $R^2$ are independently a halogen, an alkyl, an aralkyl, an aryl or other group capable of being displaced by ethylene, and M is a group 4 metal, preferably hafnium, titanium or zirconium. In another preferred embodiment the monocyclopentadienyl transition metal catalysts are those represented by the formula:

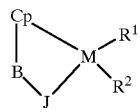

Where Cp is a substituted or unsubstituted cyclopentadienyl, fluorenyl or indenyl, B is a bridging group, such as silica, iron, oxygen, carbon, J is a heteroatom, M is a group 4 metal, such as titanium, zirconium or hafnium, and $R^1$ and $R^2$ are independently a halogen, an alkyl, an aralkyl, an aryl or other group capable of being displaced by ethylene.

A typical catalyst used to prepare the macromonomers of the invention is dimethylsilylbistetrahydroindenyl zirconium dichloride combined with methylalumoxane or dimethylsilylbistetrahydroindenyl zirconium dimethyl combined with diethylanilinium tetraperluorophenyl borate.

In a preferred embodiment the macromonomer has one or more of the following properties:

1. a weight average molecular weight of 500 to 100,000, preferably 750 to 30,000, even more preferably 1000 to 10,000 as measured by Gel Permeation Chromotography, GPC, performed with a Waters 150C, a Waters Alliance 2690 or an equivalent GPC system, equipped with a built-in differential refractive index detector for on-line detection and three columns (Mixed-D, 5 mm particle size, 300×7.5 mm) connected is series. The solvent is tetrahydrofaran (Technical Grade), used at a flow rate of 1 ml min$^{-1}$ and the operating temperature of the injector, the columns and the detector is constantly kept at 40° C. Samples are prepared in tetrahydrofuran on a 0.5% wt/vol concentration basis and 0.06% wt/vol of sulfur are added as a flow check standard.

2. an ethylene content of 20 to 90 mole %, as measured by proton NMR, preferably 30 mole % to 80 mole %, even more preferably 40 mole % to 75 mole %;

3. an Mw/Mn of 6 or less, preferably in between 1 and 4, more preferably between 1 and 2.5, (Mw and Mn are measured according to the procedure listed in 1 above); and/or 4. at least 30%, preferably between 60 and 95% terminal unsaturation as measured by proton NMR.

In another preferred embodiment the macromonomer comprises a mixture of two or more of the macromonomers described above. Such combinations may be made by polymerizing the desired monomers in the same reactor using two different activated catalysts, polymerizing in series using the same or different catalysts or by physically combining the macromonomers. In another embodiment the macromonomers have:

a) different molecular weights and different MWD's (Mw/Mn);

b) the same molecular weights and different MWD's;

c) the same molecular weights and same MWD's; or d) different molecular weights and same MWD's.

Comonomer and comonomer content of the macromonomers can be varied as well. Also the concentration of the macromonomer in the macromonomer blend may be varied providing final polymer with varied macromonomer units.

Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, α-methyl crotonic, and cinnamic acids as well as their anhydrides, esters and salt derivatives. Maleic anhydride is particularly preferred.

The copolymers of the macromonomer and the unsaturated acid or anhydride are typically prepared by the combining the macromonomer and the unsaturated acid or anhydride with a free radical initiator generally in a solvent or diluent. The reaction is typically conducted a temperature in the range of from 20° C. to 140° C., preferably 40 to 100° C. The solvent is typically used in a volume ratio of solvent to macromonomer of about 1:1 to about 100:1, preferably from 1.5:1 to 4:1. Suitable solvents include liquid $C_6$ to $C_{20}$ saturated or aromatic hydrocarbons, $C_3$ to $C_5$ ketones, liquid saturated $C_1$ to $C_5$ hydrocarbons, aliphatic halogenated hydrocarbons (preferably dihalogenated hydrocarbons), and liquid cyclic ethers. By liquid is meant liquid under the reaction conditions employed. Preferred solvents include acetone, methylethylketone, diethylketone, methylisobutylketone, benzene, xylene, toluene, dichloromethane, dibromomethane, 1-bromo-2-chloroethane, 1,1-dibromomethane, 1,1-dichloroethane, 1,2-dichloroethane, 1,3-dibromopropane, 1,2-dibromopropane, 1,2-dibromo-2-methylpropane, 1,2-dichloropropane, 1,3-dichloropropane, 1-bromo-2-chloropropane, 1,2-dichlorobutane, 1,5-dibromopentane, 1,5-dichloropentane, dioxane, tetrahydrofuran and mixtures thereof. Oils may also be used as a solvent. Dispersing agents and /or cosolvents may be used as well. Alternatively, the reaction may be conducted neat when the macromonomer's molecular weight is low enough to act as a diluent, for example below 10,000 Mn.

The reaction may be initiated by any free radical initiator that will decompose thermally under the reaction conditions employed. Preferred free radical initiators are peroxide-type initiators and azo-type initiators. Radiation can also be used to initiate the reaction if desired. Tables listing peroxide-type initiators and azo-type initiators that can be used in the practice of this invention are set forth in "Initiators", C. S. Sheppard and V. Kamath, pages 355–373 in Kirk-Othmer Encyclopedia of Chemical Technology, 3d edition Volume 13, Wiley Interscience, New York, 1981. A list of suitable azo-compounds is also disclosed in U.S. Pat. No. 2,551,813. Preferred initiator compounds include benzoyl peroxide, di-tert-butyl peroxide, tert-butyl peroxide, dicumyl peroxide, lauryl peroxide, 2,4-dichlorobenzoyl peroxide, tertiary butyl hydroperoxide, cumene hydroperoxide, diacetyl peroxide, acetyl hydroperoxide, diethylperoxycarbonate, tertiary butyl perbenzoate, α-α'-azibisisobutyronitrile, p-bromobenzenediazonium fluroborate, p-tolyldiazoaminobenzene, p-bromobenzenediazonium hydroxide, azomethane, phenyldiazonium halides and mixtures thereof. The initiator is typically employed at levels of from 0.001 to about 0.2, preferably 0.005 to 0.10 moles of initiator per mole of acid or anhydride present.

The copolymer of the macromonomer and the acid or anhydride is then recovered by typical means known in the art such as freeze drying, nonsolvent precipitation, vacuum, vacuum distillation, distillation, solvent evaporation, and the like.

The copolymer of the macromonomer and the unsaturated acid or anhydride generally has one or more of the following properties:

1. an ethylene content of 20 to 90 mole %, as measured by proton NMR, preferably 30 mole % to 80 mole %, even more preferably 40 mole % to 75 mole %;
2. weight average molecular weight of 1500 to 500,000, preferably 1500, to 100,000, preferably 3000 to 30,000;
3. an acid number between 3 and 90 gr KOH/gr polymer, preferably between 10–60, even more preferably between 20–40, as measured by ASTM D-1836; and/or
4. a melt index of 1 dg/min or more.

The copolymer of the macromonomer and the unsaturated acid or anhydride preferably has at least 50%, preferably at least 75%, even more preferably at least 90% less terminal unsaturations than the beginning macromonomer.

The copolymer may also be cured or cross-linked. Preferred curing agents include heat, moisture, cross-linking agents and/or radiation. Preferred cross-linking agents include those having functional groups that can react with the acid or anhydride group. Preferred crosslinking agents include alcohols, polyols, amines, and/or polyamines. Examples of crosslinking agents useful in this invention include polyamines such as ethylenediamine, diethylenetriamine, hexamethylenediamine, diethylaminopropylamine, and/or menthanediamine.

The copolymers described above may be used as adhesives or in compositions where adhesion is desired. Further, in another embodiment, the copolymers described above may be used in adhesive compositions. For example the copolymer may be combined with a tackifier (also called a resin) to form an adhesive. Preferred tackifiers include one or more of a natural or hydrocarbon resins, natural rosins, rosin esters, tall oil rosin esters, hydrogenated natural or hydrocarbon resins, hydrogenated rosins, hydrogenated rosin esters, hydrogenated tall oil rosin esters, terpene resins, hydrocarbon terpene resins, aromatic terpene resins, hydrogenated terpene resins or mixtures thereof. In a preferred embodiment the resin(s) has a softening point (as measured by ASTM E-28) of 10° C. to 150° C., preferably from 50° C. to 130° C.

Preferred resins include resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof Additional preferred resins include those described in WO 91/07472, U.S. Pat. Nos. 5,571,867, 5,171,793 and 4,078,132.

Typically the resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc). Likewise resins may also be obtained by the thermal polymerization of dicyclopentadiene, and/or the thermal polymerization of dimers or oligomers of cyclopentadiene and /or methylcyclopentadiene, optionally with vinylaromatics (such as styrene, alpha-methyl styrene, vinyl toluene, indene, methyl indene).

The resins obtained after polymerization and separation of unreacted materials, can be hydrogenated if desired.

Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

Generally the tackifier may be present at up to 80% by weight, based upon the weight of the copolymer and the tackifier. In a preferred embodiment the tackifier is present at 30 to 75 weight %, preferably 40 to 70 weight %.

In a preferred embodiment the adhesive composition comprising the copolymer further comprises a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaminopropylamine, and/or menthanediamine.

The adhesive composition may further comprise typical additives known in the art such as fillers, antioxidants, adjuvants, oils, and/or plasticizers. Preferred fillers include titanium dioxide, calcium carbonate, barium sulfate, silica, silicon dioxide, carbon black, sand, glass beads, mineral aggregates, clay and the like. Preferred antioxidants include phenolic antioxidants, such as Irganox 1010, Irganox, 1076 both available from Ciba-Geigy. Preferred oils include paraffinic or napthenic oils such as Primol 352, or Primol 876 available from Exxon Chemical France, S.A. in Paris, France. Preferred plasticizers include polybutenes, such as Parapol 950 and Parapol 1300 available from Exxon Chemical Company in Houston Tex.

The adhesive described above may be applied to any substrate. Preferred substrates include wood, paper, cardboard, plastic, thermoplastic, rubber, metal, metal foil, cloth, non-wovens, cardboard, stone, plaster, glass, foam, rock, ceramics, films, polymer foams (such as polyurethane foam) or combinations thereof.

In a preferred embodiment a composition comprising a resin, extender or oil and/or plasticizer, fillers and pigment is used for thermoplastic road marking. The filler typically comprises sand, mineral aggregates and/or calcium carbonate and glass beads. The composition can additionally comprise one or more polymers from the group consisting of styrene block copolymers, ethylene vinyl ester copolymers, ethylene homopolymers, copolymers of ethylene and one or more C2 to C40 alpha-olefins or alpha-beta unsaturated monomers.

A typical thermoplastic road marking formulation comprises: Organic binders (for example 17 weight % of resin and 3 weight % oil) and Mineral portions (such as 40 weight % sand, 20 weight % glass beads, 15 weight % calcium carbonate, and 5 weight % titanium dioxide). Polymeric additives can be added in the range of 0.1 to 4 weight % at the expense of the resin or oil constituting the organic binder of the blend.

EXAMPLES

Brookfield Viscosity was measured according to ASTM D 3236 at 150° C. & 190° C.

Acid Number was measured according to ASTM D-1836.

T-Peel was measured according to ASTM D 1876-72 (2×25 cm test specimens and 2 inch/min (5.08 cm/ min) head speed)

SAFT (Shear Adhesion Fail Temperature) was measured by adhereing a coated polyethylene strip of 25 mm width to stainless steel via press lamination with a contact area of 12.5mm×25mm, hanging samples in an oven held at 25° C. and suspending a 500 gram weight from the bottom of the strip. The temperature is raised at 0.4° C./min and the bond failure temperature is measured. The SAFT is the average of three test samples. (° C.).

Flexural Testing was performed according to ASTM D-790. (100×30×3 mm) specimens of the blend were prepared. Temperature variation was from −20 to 25° C. at 5° intervals. At each temperature the 0.5% strain was recorded.

Softening point was measured by the procedure in ASTM E-28. Likewise Softening point to measure the surface hardness of the road marking line is also measured by the procedure in ASTM E-28.

Yellowness (YI) whiteness (WI) and reflectance (Y) of a blend are measured using a Hunterlab colorimeter. The CIE (light source) coordinates X, Y, and Z are measured on a Hunterlab colorimeter (Standard Illuminant D65), geometry: 45°/90°. Yellowness and whiteness indices are derived from the following formulae:

1. Whiteness index (ASTM E313): $WI_{313}=(3.4 \times Z_{CIE})-(3 \times Y_{CIE})$. The higher the WI the more White a sample is. Typical and acceptable WI values are 30 or more. For road marking applications a high WI is desired.
2. Yellowness index (ASTM D 1925): $YI_{D1925}=(128 \times X_{CIE}-106 \times Z_{CIE})/Y_{CIE}$. The higher the YI number the more yellow the sample is. Typical acceptable values are 15 or less. Both sides of the specimen are measured and reported. For road marking applications a low YI is desired.

Molecular weights (Mw and Mn) were measured by Gel Permeation Chromotography, unless otherwise noted, using a Waters 150C, equipped with a build-in differential refractive index detector for on-line detection. Three Polymer Labs, Inc. (PL) columns (Mixed-D, 5 mm particle size, 300×7.5 mm) were connected is series. The solvent was tetrahydrofuran (Technical Grade), used at a flow rate of 1 ml min$^{-1}$ and the operating temperature of the injector, the columns and the detector was constantly kept at 40° C. Samples were prepared in tetrahydrofuran on a 0.5% wt/vol concentration basis and 0.06% wt/vol of sulfur was added as a flow check standard. The sample injection size was 150 µl. A calibration curve was established by means of polystyrene standards, but converted to ethylene/butene equivalent molecular weights using a series of ethylene butene copolymer standards whose molecular weight and composition were precisely known. The numerical analyses were performed using Expert Ease™ software available from Waters Corporation.

EXAMPLE 1

A copolymer (EB-1) of about 64 weight % ethylene and about 36 weight % butene and having an Mn of 2677 gr/mole was produced according to the following procedure:

A feed stream containing 30.6 weight % butene, 41.5 weight % ethylene, and 27.9 weight % isobutane were feed into a boiling agitated reactor. Dimethylsilylbistetrahydroindenyl zirconium dichloride and methylalumoxane cocatalyst were added to the reaction in a ratio of Zr:Al of 500:1. The catalyst concentration was kept at 0.0000034 gram mole per liter. The reaction temperature was 185° F.(85° C.), the residence time was 62 minutes and the stirring rate was 190 rpm.

The copolymer of ethylene-butene produced above EB-1 was copolymerized with maleic anhydride according to the following procedure: Two 2 liter flasks were charged with 250g of EB-1. Each flask was equipped with an air driven stirrer, a nitrogen gas sparge, a thermometer, and a condenser. 833 ml of toluene was added to each flask and the mixtures were stirred until the EB-1 dissolved. The solutions were sparged with nitrogen gas to remove oxygen. 52.3 g of maleic anhydride was added to each solution, while the flasks were heated to 95° C., with continued nitrogen sparge. After one hour at 95° C., the sparges we removed and replaced with nitrogen gas blankets. 20.9g of benzoyl peroxide was then added to each solution, which were maintained at 95° C. for 16 hours. The solutions were then combined, cooled to room temperature and the polymer product was precipitated by the addition of excess acetone. Subsequently, the product was washed with acetone, air dried for 7 days, and then dried in a vacuum oven for 96 hours at 60° C. for 16 hours. The copolymer EB-1 had an Mn of 2677.

The product (EBMA-1) had an acid number of 46.5 mgr KOH/gr sample and a Brookfield Viscosity of 18,500 mPas at 150° C. and 1820 mPas at 190° C.

EXAMPLE 2

A 15 wt % solution of the EBMA-1 produced in Example 1 in toluene was made to obtain a 40 micron thick coating on an aluminum sheet (25 cm×10 cm). After drying (10 min at room temperature, 10 min. in a ventilated oven at 60° C. and then 5 min at room temperature) and coating weight determination, the coated aluminum sheets were pressed at 100° C. for 10, 30 or 60 minutes at a pressure 113 psi (779 kPa) on an area of 250 cm$^2$. SAFT and T-peel measurements were then conducted. The coating weight was 40 gr/m$^2$. The data are reported in Table I

TABLE I

| Sample References | A | B | C |
|---|---|---|---|
| Curing conditions* | 10 min | 30 min | 60 min |
| T-Peel Al/Al (N/cm) | 0.62 | 0.72 | 0.91 |
| SAFT (° C.) 1" × 0.5"/0.5 kg | 82 | 83 | 85 |

*(113 psi/779 kPa/100° C.)

EXAMPLE 3

A 15 wt % solution of EBMA-1 produced in Example 1 in toluene was made to obtain a 40 micron thick coating on an aluminum sheet (25 cm×10 cm). The coating weight was 40 gr/m$^2$ except for sample I which had a coating weight of 12 gr/m$^2$. Then a 40 wt % amine in toluene solution was coated (superimposed) on the EBMA-1 coated aluminum sheets. After drying (10 min at room temperature, 10 min. in a ventilated oven at 60° C. and then 5 min at room temperature) and coating weight determination, the coated aluminum sheets were covered with a second clean aluminum sheet and pressed for 30 minutes at 100, 130 or 150° C. The amine quantity coated was in excess of the EBMA (0.14 gr/gr EBMA polymer if mole/mole). The amine used was VESTAMIN from Hüls a 3-aminoethyl-3,5,5-trimethylcyclohexamine(-isophoronediamine). Saft and T-Peel tests were performed. The data are presented in Table II.

TABLE II

| Sample Reference | D | E | F | G | H | I |
|---|---|---|---|---|---|---|
| gr Vestamin/gr EBMA | None | 0.21–0.23 | 0.28–0.24 | 0.17 | 0.49 | 0.51 |
| Temperature (° C.) | 100 | 100 | 130 | 130 | 130 | 150 |
| T-Peel, N/cm (Al/Al) | 0.72 | 5 | 5.5 | — | — | 0.95 |
| SAFT, ° C. | 83 | 120 | 120 | 120 | 58 | — |

In sample H, the amine appears to act as a plasticizer at the interface. In sample I a low coating weight of 12 gr/m$^2$ was obtained.

The Vestamin solution alone coated onto an aluminum plate gave no measurable peel adhesion.

The effect of cross-linking the EBMA-1 yields excellent adhesive properties in both the peel and shear tests. These results, however, can be adversely affected by the addition of too much cross-linking agent.

EXAMPLE 4

Three copolymers of ethylene butene macromonomer copolymerized with maleic anhydride were blended into road marking formulations and tested. The data are as follows:

| | | | | |
|---|---|---|---|---|
| Escorez 1102 RM (wt %) | 17.0 | 15.0 | 15.0 | 15.0 |
| Oil (wt %) | 3.0 | 3.0 | 3.0 | 3.0 |
| Sand (wt %) | 40.0 | 40.0 | 40.0 | 40.0 |
| Glass Beads (wt %) | 20.0 | 20.0 | 20.0 | 20.0 |
| CaCO$_3$ (wt %) | 15.0 | 15.0 | 15.0 | 15.0 |
| TiO$_2$ (wt %) | 5.0 | 5.0 | 5.0 | 5.0 |
| Copolymer P-42-23 (wt %) | | 2.0 | | |
| Copolymer P-42-19 (wt %) | | | 2.0 | |
| Copolymer P-42-31 (wt %) | | | | 2.0 |
| Zahn Viscosity at 200° C. (sec) | 23 | 19 | 30 | >210 |
| Softening Point (° C.) | 86 | 73 | 74 | 80 |
| Reflectance | 83/81 | 80/85 | 82/85 | 79/79 |
| Whiteness Index | 52/50 | 29/55 | 38/56 | 32/39 |
| Yellowness Index | 11/11 | 19/11 | 16/10 | 18/15 |
| Flexural Testing | | | | |
| 0° C. | | brittle | brittle | |
| 5° C. | | ok | ok | brittle |
| 10° C. | | ok | ok | ok |
| 15° C. | brittle | | | ok |
| 20° C. | ok | | | |

P42-23, P42-19 and P42-31 were made according to the same procedure as EB-1 except that the monomer ratios were varied. All are ethylene butene copolymers.

P42–23 had an ethylene content of 40.7 weight % and a number average molecular weight of 1960 g/mole. P42-19 had an ethylene content of 41.8 weight % and a number average molecular weight of 4030 g/mol. P42-31 had an ethylene content of 64.3 weight % and a number average molecular weight of 2677 g/mole.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. An adhesive composition comprising a tackifier and a copolymer comprising one or more macromonomer units and an unsaturated acid unit or an unsaturated anhydride unit wherein the weight average molecular weight of the copolymer is at least twice the weight average molecular weight of the macromonomer unit, the melt index of the copolymer is greater than or equal to 1 and wherein the macromonomer unit:

(1) has a weight average molecular weight between 500 and 100,000; and (2) comprises a copolymer of ethylene and at least one α-olefin, and/or a copolymer of propylene and ethylene or propylene and at least one other α-olefin.

2. The adhesive composition of claim 1 wherein the weight average molecular weight of the copolymer is at least three times the weight average molecular weight of the macromonomer unit.

3. The adhesive composition of claim 1 wherein the weight average molecular weight of the copolymer is at least four times the weight average molecular weight of the macromonomer unit.

4. The adhesive composition of claim 1 wherein the copolymer has an acid number between 3 and 90 mgr KOH per gr of copolymer.

5. The adhesive of claim 1 further comprising a filler selected from the group consisting of silica, sand, glass beads, calcium carbonate, titanium dioxide or a combination thereof.

6. The adhesive of claim 1 further comprising crosslinking agent.

7. The adhesive of claim 6 wherein the adhesive has been crosslinked by curing with heat, moisture or radiation.

8. The adhesive of claim 1 wherein the macromonomer unit comprises a copolymer of ethylene and a $C_3$ to $C_{30}$ α-olefin.

9. The adhesive of claim 8 wherein the α-olefin is one or more linear or branched α-olefins selected from the group consisting of propylene, butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

10. The adhesive of claim 1 wherein the macromonomer unit comprises a copolymer of propylene and ethylene or a $C_4$ to $C_{30}$ α-olefin.

11. The adhesive of claim 10 wherein the α-olefin is one or more linear or branched α-olefin selected from the group consisting of butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

12. The adhesive of claim 1 wherein the macromonomer unit comprises a terpolymer of ethylene, propylene and a $C_4$ to $C_{30}$ α-olefin.

13. The adhesive of claim 1 wherein copolymer further comprises a second macromonomer unit that is different from the macromonomer unit wherein the second macromonomer unit:

(1) has a weight average molecular weight between 500 and 100,000; and (2) comprises a copolymer of ethylene and at least one α-olefin, and/or a copolymer of propylene and ethylene or propylene and at least one other α-olefin.

14. The adhesive of claim 1 wherein the unsaturated acid unit or anhydride unit is derived from an organic compound containing an ethylenic unsaturation conjugated with a carbonyl group.

15. The adhesive of claim 1 wherein the unsaturated acid unit or anhydride unit is derived from maleic acid or maleic anhydride.

16. The adhesive of claim 6 wherein the crosslinking agent is an amine, a polyamine, a diol or a polyol.

17. The adhesive of claim 1 wherein the tackifier is a natural or hydrocarbon resin, a natural rosin, a rosin ester, a tall oil rosin ester, a hydrogenated natural or hydrocarbon resin, a hydrogenated natural rosin, a hydrogenated rosin ester, a hydrogenated tall oil rosin ester, a terpene resin, an hydrogenated terpene resin or a mixture thereof.

18. The adhesive of claim 1 wherein the tackifier is a hydrogenated resin.

19. The adhesive of claim 1 wherein the tackifier is present at 30 to 80 weight % based upon the weight of the tackifier and the copolymer.

20. A hot melt adhesive comprising the adhesive of claim 1.

21. An article of manufacture comprising the adhesive of claim 1 and a substrate.

22. The article of claim 21 wherein the substrate comprises wood, paper, plastic, thermoplastic, rubber, metal, metal foil, cloth, non-wovens, cardboard, stone, plaster, glass, or a polymer foam.

23. An adhesive composition comprising a tackifier and a copolymer comprising one or more first macromonomer units and an unsaturated acid unit or an unsaturated anhydride unit wherein the weight average molecular weight of the copolymer is at least twice the weight average molecular weight of the first macromonomer unit, the melt index of the copolymer is greater than or equal to 1, the copolymer has an acid number between 3 and 90 mgr KOH per gr of copolymer, and wherein the first macromonomer unit:
   (1) has a weight average molecular weight between 500 and 100,000; and
   (2) comprises a copolymer of ethylene and at least one α-olefin, and/or a copolymer of propylene and ethylene or propylene and at least one other α-olefin, wherein the α-olefin is one or more linear or branched α-olefins selected from the group consisting of butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1.

24. The adhesive of claim 23 further comprising crosslinking agent.

25. The adhesive of claim 24 wherein the adhesive has been crosslinked by curing with heat, moisture or radiation.

26. The adhesive of claim 24 wherein the crosslinking agent is an amine, a polyamine, a diol or a polyol.

27. The adhesive of claim 23 wherein the tackifier is a natural or hydrocarbon resin, a natural rosin, a rosin ester, a tall oil rosin ester, a hydrogenated natural or hydrocarbon resin, a hydrogenated natural rosin, a hydrogenated rosin ester, a hydrogenated tall oil rosin ester, a terpene resin, an hydrogenated terpene resin or a mixture thereof.

28. The adhesive of claim 23 wherein the tackifier is a hydrogenated resin.

29. The adhesive of claim 23 wherein the tackifier is present at 30 to 80 weight % based upon the weight of the tackifier and the copolymer.

30. The adhesive of claim 23 further comprising a filler selected from the group consisting of silica, sand, glass beads, calcium carbonate, titanium dioxide or a combination thereof.

31. A hot melt adhesive comprising the adhesive of claim 23.

32. An article of manufacture comprising the adhesive of claim 23 and a substrate.

33. The article of claim 32 wherein the substrate comprises wood, paper, plastic, thermoplastic, rubber, metal, metal foil, cloth, non-wovens, cardboard, stone, plaster, glass, or a polymer foam.

34. The adhesive of claim 23 wherein copolymer further comprises one or more second macromonomer units wherein the second macromonomer unit is different from the first macromonomer unit and wherein the second macromonomer unit:
   (1) has a weight average molecular weight between 500 and 100,000; and
   (2) comprises a copolymer of ethylene and at least one α-olefin, and/or a copolymer of propylene and ethylene or propylene and at least one other α-olefin.

35. An adhesive composition comprising:
   a tackifier, wherein the tackifier is a natural or hydrocarbon resin, a natural rosin, a rosin ester, a tall oil rosin ester, a hydrogenated natural or hydrocarbon resin, a hydrogenated natural rosin, a hydrogenated rosin ester, a hydrogenated tall oil rosin ester, a terpene resin, an hydrogenated terpene resin or a mixture thereof;
   a copolymer comprising one or more macromonomer units and one or more unsaturated acid units or one or more unsaturated anhydride units, wherein the unsaturated acid unit or anhydride unit is an organic compound containing an ethylenic unsaturation conjugated with a carbonyl group, wherein the weight average molecular weight of the copolymer is at least three times the weight average molecular weight of the macromonomer unit, the melt index of the copolymer is greater than or equal to 1, the copolymer has an acid number between 3 and 90 mgr KOH per gr of copolymer and wherein the macromonomer unit:
   (1) has a weight average molecular weight between 500 and 100,000; and
   (2) comprises a copolymer of ethylene and at least one α-olefin, and/or a copolymer of propylene and ethylene or propylene and at least one other α-olefin, wherein the α-olefin is one or more linear or branched α-olefins selected from the group consisting of butene, isobutene, pentene, hexene, heptene, octene, nonene, decene, dodecene, 3-methyl-pentene-1, 4-methyl-pentene-1, 2-ethyl-hexene, and 3,5,5-trimethyl hexene-1 and;
   wherein the copolymer further comprises one or more second macromonomer units that are different from the macromonomer unit wherein the second macromonomer unit:
   (1) has a weight average molecular weight between 500 and 100,000; and
   (2) comprises a copolymer of ethylene and at least one α-olefin, and/or a copolymer of propylene and ethylene or propylene and at least one other α-olefin.

36. The adhesive of claim 35 further comprising crosslinking agent.

37. The adhesive of claim 36 wherein the adhesive has been crosslinked by curing with heat, moisture or radiation.

38. The adhesive of claim 36 wherein the crosslinking agent is an amine, a polyamine, a diol or a polyol.

39. The adhesive of claim 35 wherein the tackifier is present at 30 to 80 weight % based upon the weight of the tackifier and the copolymer.

40. The adhesive of claim 35 further comprising a filler selected from the group consisting of silica, sand, glass beads, calcium carbonate, titanium dioxide or a combination thereof.

41. A hot melt adhesive comprising the adhesive of claim 35.

42. An article of manufacture comprising the adhesive of claim 35 and a substrate.

43. The article of claim 42 wherein the substrate comprises wood, paper, plastic, thermoplastic, rubber, metal, metal foil, cloth, non-wovens, cardboard, stone, plaster, glass, or a polymer foam.

* * * * *